United States Patent
Lestander et al.

(10) Patent No.: US 10,421,245 B2
(45) Date of Patent: Sep. 24, 2019

(54) PELLET MILL WITH ADDITION OF FLUID

(71) Applicants: Torbjorn Lestander, Umea (SE); Sylvia Helena Larsson, Umea (SE); Mikael Thyrel, Vannas (SE); Magnus Rudolfsson, Umea (SE)

(72) Inventors: Torbjorn Lestander, Umea (SE); Sylvia Helena Larsson, Umea (SE); Mikael Thyrel, Vannas (SE); Magnus Rudolfsson, Umea (SE)

(*) Notice: Subject to any disclaimer, the term of this patent is extended or adjusted under 35 U.S.C. 154(b) by 0 days.

(21) Appl. No.: 16/099,286

(22) PCT Filed: May 17, 2017

(86) PCT No.: PCT/SE2017/050515
§ 371 (c)(1),
(2) Date: Nov. 6, 2018

(87) PCT Pub. No.: WO2017/200472
PCT Pub. Date: Nov. 23, 2017

(65) Prior Publication Data
US 2019/0210315 A1    Jul. 11, 2019

(30) Foreign Application Priority Data
May 19, 2016  (SE) ...................... 1650681

(51) Int. Cl.
*B30B 11/20* (2006.01)
*B30B 15/08* (2006.01)
(Continued)

(52) U.S. Cl.
CPC .......... *B30B 11/207* (2013.01); *B30B 11/228* (2013.01); *B30B 15/08* (2013.01);
(Continued)

(58) Field of Classification Search
CPC ......... B29B 9/06; B30B 11/20; B30B 11/201; B30B 11/228; A23N 17/005; B01J 2/20
(Continued)

(56) References Cited

U.S. PATENT DOCUMENTS 2,755,509 A    7/1956  Smidth
2,887,718 A    5/1959  Curran et al.
(Continued)

FOREIGN PATENT DOCUMENTS

GB    850046      9/1960
KR    100942728   2/2010
SE    458559      9/1984

OTHER PUBLICATIONS

International Search Report on corresponding PCT application (PCT/SE2017/050515) from International Searching Authority (SE) dated Jun. 27, 2017.
(Continued)

*Primary Examiner* — James P Mackey
(74) *Attorney, Agent, or Firm* — Klein, O'Neill & Singh, LLP (57) ABSTRACT

In a first aspect the present invention relates to a pellet mill (10) comprising a die (30) having a first surface (34) and a second surface (36), the die further comprising press holes (38) extending from the first surface to the second surface, at least one roller (50) configured to roll over the first surface for forcing a pelletizable material, forming a feed layer (2) on the first surface, through the press holes to the second surface, and a nozzle (82) configured to provide an additive fluid (4) directly into the nip (86) between the at least one roller and the first surface. In a second aspect the present invention relates to a method of producing pellets, and in a third aspect the present invention related to method of retrofitting a pellet mill.

12 Claims, 6 Drawing Sheets

(51) Int. Cl.
*B30B 11/22* (2006.01)
*B01J 2/20* (2006.01)
*B29B 9/06* (2006.01)
*A23N 17/00* (2006.01)

(52) U.S. Cl.
CPC ............... *A23N 17/005* (2013.01); *B01J 2/20* (2013.01); *B29B 9/06* (2013.01); *B30B 11/201* (2013.01)

(58) Field of Classification Search
USPC .............................. 425/331; 100/73, 74, 905
See application file for complete search history.

(56) References Cited

U.S. PATENT DOCUMENTS

| | | | |
|---|---|---|---|
| 3,124,837 A * | 3/1964 | Jackson et al. ......... | B30B 11/20 425/147 |
| 4,725,958 A | 2/1988 | Volk, Jr. | |
| 4,729,899 A * | 3/1988 | Volk, Jr. .................. | A23P 10/25 118/24 |
| 2012/0211914 A1 | 8/2012 | Walker | |

OTHER PUBLICATIONS

Written Opinion on corresponding PCT application (PCT/ SE2017/ 050515) from International Searching Authority (SE) dated Jun. 27, 2017.

* cited by examiner

PELLET MILL WITH ADDITION OF FLUID

CROSS-REFERENCE TO RELATED APPLICATION

This application is the National Phase, under 35 U.S.C. § 371(c), of International Application No. PCT/SE2017/050515, filed May 17, 2017, which claims priority from SE 1650681-8, filed May 19, 2016. The disclosures of all of the referenced applications are incorporated herein by reference in their entirety.

FEDERALLY SPONSORED RESEARCH OR DEVELOPMENT

Not Applicable

TECHNICAL FIELD OF THE INVENTION

The present invention relates generally to the field of pellet mills, also known as ring and flat die extrusion presses, for pelletizing materials. The materials being pelletized range from feedstuffs, for example animal feeds, to biomass, for example wood chips or saw dust, and the finished pellets may, depending on the material, be used as feed or as a bioenergy commodity or as a feedstock e.g. in biorefinery processes to produce chemicals, fuels and other products or in thermally based processes like pyrolysis and/or gasification. The present invention specifically relates to the field of treatment of the material to be pelletized. Thus the present invention relates specifically to the field of pellet mills wherein one or more additive fluids may be provided to the material to be pelletized prior to the pelletization. The invention further relates to the field of methods of pelletizing material wherein at least one additive fluid is provided to the material, and the field of methods of retrofitting a pellet mill.

BACKGROUND OF THE INVENTION

Pellet mills include ring extrusion presses and flat die extrusion presses. Ring extrusion presses generally comprise an annular die having an inner surface facing the center point of the annular die and an outer surface facing away from the center point. The annular die thus resembles a finger ring, i.e. a round band. Die holes, typically radially directed, extend from the inner surface to the outer surface to allow the material to be pelletized to pass through the holes from the inner surface of the die to the outer surface, thereby forming strands of the material extending radially out from the outer surface. One or more knives arranged to move in relation to the annular die then cuts off the strands to form pellets. The material is supplied to the inner surface of the annular die whereupon it forms a feed layer. Rollers rolling over the inner surface of the annular die press the feed layer towards the inner surface of the annular die with high pressures, thus forcing the material in the feed layer through the die holes.

Flat die extrusion presses comprise a flat circular die, typically held stationary in a horizontal orientation, with the rollers being carried on axles extending radially from a vertically oriented rotating axle to roll over the die in a carousel fashion.

Pelletization is especially interesting for bio-based applications because the process allows the compaction, and therefore the increase in specific density, i.e. increased energy per bulk volume e.g. MJ/kg, of lignocellulosic based feedstock such as wood chips, saw dust, straw, and other biomass sources and also forest-based or agro-based waste materials, or feedstocks for feed pellets. This biobased feedstock can also have been pretreated in different ways (e.g. maturated, shredded, chipped, milled, etc.) and in different processes (e.g. thermally treatments like torrefaction, pyrolysis, etc.). In addition to increasing the density of the material the formed pellets are hard and thus easy to handle.

Pelletizing biomasses, and indeed any type of material to be pelletized, however requires that the material has the proper characteristics, in particular particle size and moisture content, if a useable feed-layer is to form. Here a usable feed layer is one which adheres sufficiently tight to the die while at the same time provides enough friction that the rollers, which are typically free rotating, i.e. not driven separately, will be caused to roll as the annular die rotates, or vice versa. Material to be pelletized is therefore typically ground or milled to a desired particle size, prior to or together with being moistened, or dried, to obtain the correct moisture content, before the now preconditioned material is supplied into the pellet mill.

Some materials, when preconditioned as needed for the pelletization process, however obtain characteristics which render the transport of the material into the pellet mill, or even the handling of the material during the preconditioning, difficult. Materials may for example become sticky, for example due to having low equilibrium moisture contents, so as to foul the equipment used for the preconditioning and bridging in conveying equipment. Further the sticky material becomes very difficult to transport e.g. in augers. These characteristics may be inherent to the material, or the material may obtain these characteristics due to pre-processing steps such as torrefaction (carbonization) in the case of biomass such as wood. Other materials may be considered unsuitable for pelletization altogether as they may chemically react with moisture, thus precluding the mixing of these materials.

U.S. Pat. No. 2,887,718 describes an attempt to postpone the addition of moisture to the material by providing a pellet mill having an annular die with rollers, the pellet mill further comprising a conduit for directing a fluid such as water towards a spray head for spraying the fluid onto the inner surface of the annular die for moistening the material to be pelletized.

GB850046A further proposes a pellet mill in which the need for premixing of material to be pelletized is obviated by providing a port adjacent the annular die where a liquid can be delivered into the die.

In view of these attempts the present inventors have realized that while addition of moisture into the annular die may to some degree appear to solve the problem of handling difficult to pelletize materials, these attempts do not provide for fine control of the moisture content of the feed layer and the resulting pellets. Further, with rising die temperatures a large amount of the added moisture will evaporate so that the moisture content in the produced pellets is by no means guaranteed.

In addition these attempts do not provide for the realization of more advanced pellets.

OBJECT OF THE INVENTION

The present invention aims at obviating the aforementioned disadvantages and failings of previously known pellet mills. A primary object of the present invention is to provide an improved pellet mill in which the characteristics, such as the moisture content, of the material to be pelletized may be more finely controlled. A secondary object of the present invention is to provide an improved pellet mill of the initially defined type which allows for the production of more advanced pellets.

SUMMARY OF THE INVENTION

According to the invention at least the primary object is attained by means of the initially defined pellet mill having the features defined in the independent claims. Preferred embodiments of the present invention are further defined in the dependent claims.

According to a first aspect of the present invention, there is therefore provided a pellet mill comprising
a die having a first surface and a second surface, the die further comprising press holes extending from the first surface to the second surface,
at least one roller configured to roll over the first surface for forcing a pelletizable material, forming a feed layer on the first surface, through the press holes to the second surface, and,
a nozzle configured to provide at least one additive fluid directly into the nip between the at least one roller and the first surface.

Thus the pellet mill according to the first aspect of the present invention is characterized in that additive fluid is provided directly into the nip, i.e. where the feed layer is formed and successively pressed by the rollers through the press holes. Where the additive fluid is water this minimizes the formation of steam in the pellet mill while still ensuring that the water provides the correct moisture content for the pelleting process and works as a lubricant in the press holes for facilitating pressing the pelletizable material through the press holes. Further it makes it possible to control the moisture content of the feed layer, and hence the pellets, very exactly. This improved control enhances the stability of the feed layer. In addition it allows for cooling the feed layer so that pellet production may be performed also at high die temperatures e.g. such as 80° C. or more.

Where the additive fluid is other than water, such as for example a binder or catalyst, this allows the precise formation of layers in the feed layer and thus allows for producing more advanced pellets.

The die may be shaped like a disc, or more commonly as an annular die in the form of a finger ring or closed circular ribbon. The die may preferably be made of metal. The die may be stationary and the at least one roller driven to move relative to the die, or alternatively the die may be driven to rotate, i.e. configured to rotate, while the roller suspension/roller holder is held stationary. In any case the roller will roll over the first surface.

The first surface may, depending on the shape of the die, be an upper surface, or an inner surface. The second surface may be opposite the first surface and may, depending on the shape of the die, be a lower or bottom surface, or an outer surface. The first and second surfaces are typically opposite to each other.

The press holes/channels may be formed by drilling. Typically the press holes, which are also known as die holes or die press channels, are distributed over the first and second surfaces and arranged to extend perpendicular through the material of the die. The press holes may typically have a length which is about 2 to 20 times the diameter of the press holes.

The at least one roller is typically a cylinder, for example made of steel. The roller may be configured, for example by being arranged to be rotatable about a roller axle affixed in a roller holder, for rolling over the first surface. Typically the roller holder is attached to one end of a roller holder axle and then a die shaft is arranged as a sleeve around the roller holder axle, the die shaft holding, at one end, the die. Alternatively the roller holder may be carried by a separate frame or structure. The roller may be configured to roll over the first surface by being positioned sufficiently close, such as from 0.05 to about 3 mm, to the first surface so that the feed layer present on the first surface provides sufficient friction to allow the roller to roll. The pelletizable material may for example be biomass such as wood or wood waste/forest residue (oak, beech, willow, spruce, pine), other biomass waste (rice husk), and animal feed mixes, etc. Further the pelletizable material may be powders and other particulate materials.

The feed layer is formed as the pelletizable material is pressed against the first surface of the die. Material from the feed layer is then successively pressed through the press holes.

The nozzle may be any type of nozzle capable of providing the additive fluid, for example by spraying or atomizing it. The nozzle is preferably configured to provide the additive fluid in a fan-shaped spray pattern oriented perpendicularly to movement direction of the feed layer so as to cover a width corresponding to the width or length of the roller.

The nozzle may be connected to a source of water. A pump is preferably provided for increasing the pressure of the water so that it may issue forth from the nozzle as a spray. Alternatively, depending on the amount of water needed, the nozzle may be connected to a water tap of a water distribution network.

The additive fluid preferably comprises water. Thus the additive fluid may be liquid water or steam. Alternatively the additive fluid may comprise a binder such as an adhesive or hydrogen peroxide. An interesting alternative is when the additive fluid comprises a release agent such as an oil or other material capable of forming a weak layer in the feed layer. By providing such a weak layer it will be possible to produce pellets which can easily be broken or crushed if needed.

In the context of the present invention the nip encompasses the region of the pellet mill where the roller and the first surface, i.e. the die, are closest together seen from in front of the roller.

In the context of the present invention directly into the nip encompasses that the additive fluid is provided, from the nozzle, in the direction towards the nip.

In a preferred embodiment of the pellet mill according to the first aspect of the present invention the pellet mill comprises at least two rollers configured to roll over the first surface for forcing the pelletizable material, forming the feed layer on the first surface, through the press holes to the second surface, and the nozzle is configured to provide at least one additive fluid directly into the nip between at least one of the at least two rollers and the first surface of the die.

At least two rollers, such as preferably two or three rollers, is the typical number of rollers in a pellet mill.

The at least one roller, into which nip the additive fluid is provided, is preferably the roller which first encounters the pelletizable material once it has been delivered into the pellet mill.

In the preferred embodiment of the pellet mill according to the first aspect of the present invention the pellet mill comprises at least two nozzles, each of the at least two nozzles being configured to provide an additive fluid directly into the nip between a corresponding one of the at least two rollers and the first surface of the die.

This is advantageous as it ensures that the amount of additive fluid provided for each of the rollers can be adjusted to ensure that all the rollers produce pellets with the same amount of additive fluid. This is especially important at higher temperatures of the die where additive fluid in then feed layer may evaporate rapidly.

In some embodiments of the pellet mill according to the first aspect of the present invention the pellet mill comprises a first and a second nozzle, each being configured to provide a corresponding first or second additive fluid directly into the nip. The first and second additive fluids may for example be the first and second components of a two component adhesive. This is advantageous as it allows the use of additive fluids which cannot be mixed before they are to be used.

In some embodiments of the pellet mill according to the first aspect of the present invention the pellet mill comprises a further nozzle configured to provide a further additive fluid onto the first surface of the die at a position downstream of at least one of the rollers.

This is advantageous as it provides further possibilities for controlling the properties of the feed layer.

The further nozzle is preferably similar to the nozzle or nozzles providing additive fluid into the nip(s) of the roller (s). The further additive fluid may be the same as the additive fluid, however the further additive may advantageously comprise a binder or a release agent as described above.

In the context of the present invention a position downstream of a roller refers to a position on the feed layer or the first surface which the roller has rolled over.

In these embodiments of the pellet mill according to the first aspect of the present invention the further nozzle may be configured to provide the further additive fluid directly into an opening zone formed between the at least one of the rollers and the first surface.

This is advantageous as it provides for adding the further additive fluid directly onto the newly formed feed layer.

In the context of the present invention the opening zone encompasses the region where the roller and the first surface, i.e. the die, are closest together seen from behind the roller.

In the preferred embodiment of the pellet mill according to the first aspect of the present invention the die is annular whereby the first surface is an inner surface and the second surface is an outer surface.

This is advantageous as this type of pellet mill is commonly used.

The annular die may be shaped like a continuous ribbon or finger ring. The inner surface is oriented towards the center axis of the ribbon or ring while the outer surface faces away from the center axis.

In an alternative embodiment of the pellet mill according to the first aspect of the present invention the die is a flat die whereby the first surface is an upper surface and the second surface is a lower surface.

The flat die is typically held stationary with the first surface being horizontal. The rollers are then carried on axles extending radially from a vertically oriented rotating axle to roll over the die in a carousel fashion.

Using the pellet mill according to the first aspect of the present invention it is possible to produce pellets with a better control of the process.

According to a second aspect of the present invention, there is therefore provided a method of producing pellets using a pellet mill comprising a die having a first surface and a second surface, the die further comprising press holes extending from the first surface to the second surface, and at least one roller configured to roll over the first surface for forcing a pelletizable material, forming a feed layer on the first surface, through the press holes to the second surface, the method comprising the steps of i. feeding a pelletizable material into the die and onto at least part of the first surface, ii. causing the roller to roll over the first surface, and iii. providing an additive fluid directly into the nip between the at least one roller and the first surface.

The pellet mill is preferably a pellet mill according to the first aspect of the present invention.

The feeding of the pelletizable material may be effected by providing a hopper connected to a chute which leads the pelletizable material into the pellet mill to a position where the pelletizable material may be deposited on at least part of the first surface.

The rollers may be caused to roll over the first surface either by driving the die, and have the rollers rotate due to the friction exerted by the feed layer on the rollers, or by having the die be stationary and allowing the roller holder/roller suspension and rollers roll and travel over the first surface.

The additive fluid is preferably provided through a nozzle as described above.

In the preferred embodiment of the method according to the second aspect of the present invention the method further comprises the steps of:

iv. determining at least one property of the produced pellets and/or determining at least one property of the pelleting process, such as pellet mill motor current, and v. controlling the amount of the additive fluid provided directly into the nip based on the property.

The determination of at least one property of the produced pellets and/or the determination at least one property of the pelleting process, such as pellet mill motor current may be made in real time. The property may be any of moisture content, density, strength, weights, etc. of the pellets, or the property may be the pellet mill motor current etc. The at least one property may be determined using a moisture sensor, a measuring beaker, scales, etc.

The amount of additive fluid may be controlled based on the property so as to achieve a set value for the property.

In the preferred embodiment of the method according to the second aspect of the present invention the additive fluid comprises water.

Advantageously the method according to the second aspect of the present invention is easy to implement also in a conventional pellet mill. Accordingly a third aspect of the present invention provides a method of retrofitting a pellet mill comprising a die having a first surface and a second surface, the die further comprising press holes extending from the first surface to the second surface, and at least one roller configured to roll over the first surface for forcing a pelletizable material, forming a feed layer on the first surface, through the press holes to the second surface, the method comprising the steps of vi. Installing a nozzle in the pellet mill, the nozzle being installed and configured to provide an additive fluid directly into the nip between the roller and the first surface.

Installing a nozzle may comprise removing a cover or opening a housing to the die. It may further comprise forming a hole in said enclosure to allow a pipe for the additive fluid to enter the enclosure.

Further advantages with, and features of, the invention will be apparent from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
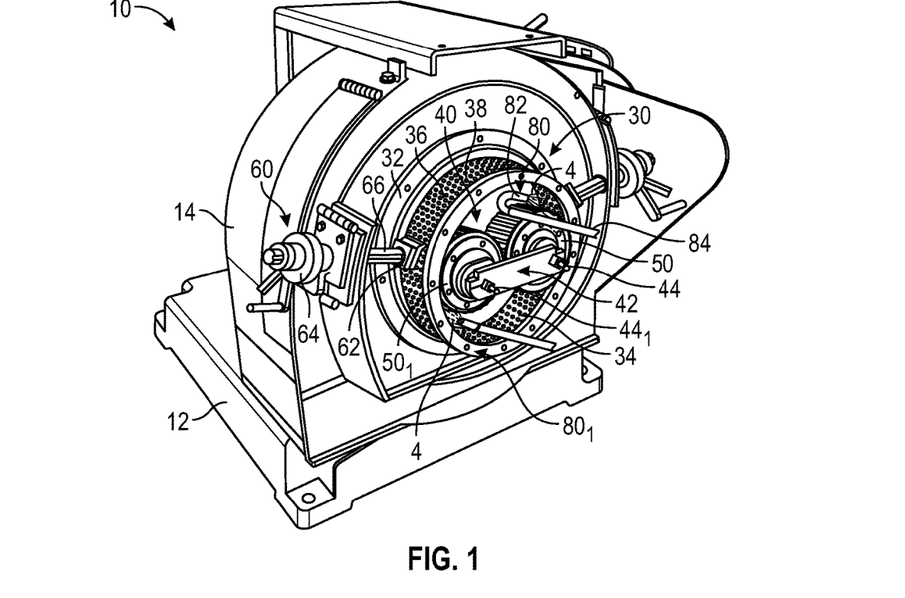
FIG. 1 is a schematic perspective view of a first embodiment of a pellet mill according to the first aspect of the present invention.
Figure 2:
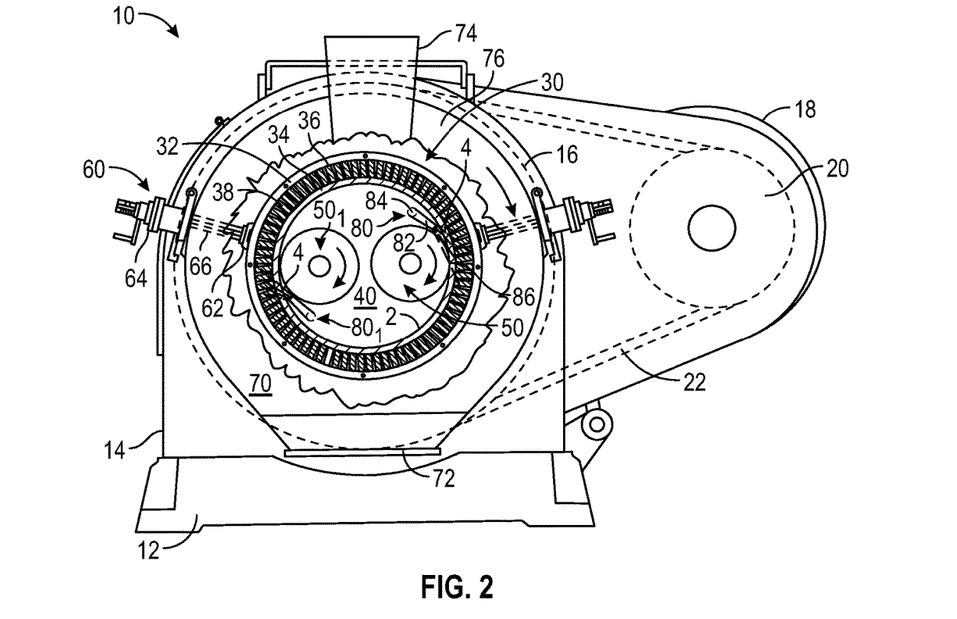
FIG. 2 is a front partial cutaway view of the first embodiment of the pellet mill.

FIGS. 1 and 2 show a first embodiment of a pellet mill 10 according to the first aspect of the present invention. The pellet mill 10 comprises a base 12. A housing 14 is mounted on the base 12 for housing a die shaft (not shown) and the bearings (not shown) supporting the die shaft. A main pulley 16 (shown in FIGS. 2-4) is mounted on the die shaft for allowing the die shaft to be rotated by a motor 18 (shown in FIGS. 2-4) driving a drive pulley 20 (shown in FIGS. 2-4) and the main pulley (shown in FIGS. 2-4) via a drive belt 22 (shown in FIGS. 2-4).

An annular die, in its entirety designated the reference numeral 30, is attached to one end of the die shaft via a die carrier 32. The die 30 comprises an inner surface 34 (first surface) and an outer surface 36 (second surface). A plurality of press holes, one of which is designated the reference numeral 38 extends from the inner surface 34 to the outer surface 36. The volume enclosed by the die 30 defines a die cavity 40 housing a roller holder 42 which carries two rollers 50 and 50$_1$ via roller axles 44 and 44$_1$. The roller holder 42 is in turn carried by a roller holder axle extending through, and coaxially with, the die shaft as is known in conventional pellet mills.

In operation the die 30 is driven to rotate by the motor 24 while the roller holder 44 remains stationary. The rollers 50 and 50$_1$ are free to rotate about the roller axles 44 and 44$_1$ and will therefore, due to the friction between the die 30 and the feed layer 2 of pelletizable material (shown in FIGS. 2-4) on the inner surface 34 of the die 30, start to rotate so as to press the material in the feed layer 2 through the press holes 38 so as to form strands of material on the outer surface 36 of the die 30. Knife assemblies, one of which is designated the reference numeral 60, comprises a knife blade 62 which is held in position by a distance adjustment mechanism 64 and arm 66 strike the strands as they have extended a suitable distance from the press holes 38 so as to form pellets of a suitable length. These pellets are collected on the outside of the die 30 by an enclosure 70 (seen in FIG. 2-4) enclosing the die 30 and having a funnel bottom 72 with an outlet for collecting and funneling the pellets from the pellet mill 10. The material to be pelletized is fed into the die cavity 40 via a hopper 74 provided on the end plate 76 of the enclosure 70.

The pellet mill 10 described so far essentially corresponds to a conventional pellet mill such as the one described in U.S. Pat. No. 2,887,718. The pellet mill 10 according the first aspect of the present invention differs, as shown in FIGS. 1 and 2, by being provided with nozzle arrangements 80 and 80$_1$ comprising a nozzle 82 and a pipe 84 arranged for providing an additive fluid, typically water 4, into the nip 86 between the roller 50 and the inner surface 34 of the die 30. The nip 86 is the wedge shaped volume defined between the roller 50 and the inner surface 34 (first surface) of the die 30.

The nozzle arrangement 80 allows the moisture content of the feed layer 2 and the pellets themselves to be exactly controlled for obtaining good quality pellets. Further the addition through the nozzles allows the moisture content of the material fed to the pellet mill 10 to have lower moisture content, thus facilitating handling, than the desired moisture content of the pellets. Also the injection of water using the nozzle arrangement cools at least the feed layer 2, thus allowing the production of pellets also at higher die temperatures.

In FIGS. 1 and 2 two nozzle arrangements 80 and 80$_1$ are provided, one for each of the rollers 50 and 50$_1$. While this is advantageous in that it allows the moisture content of the feed layer 2 to be regulated at both of the rollers 50 and 50$_1$, in many applications it is sufficient if a single nozzle arrangement is provided at one of the rollers.

Figure 3:
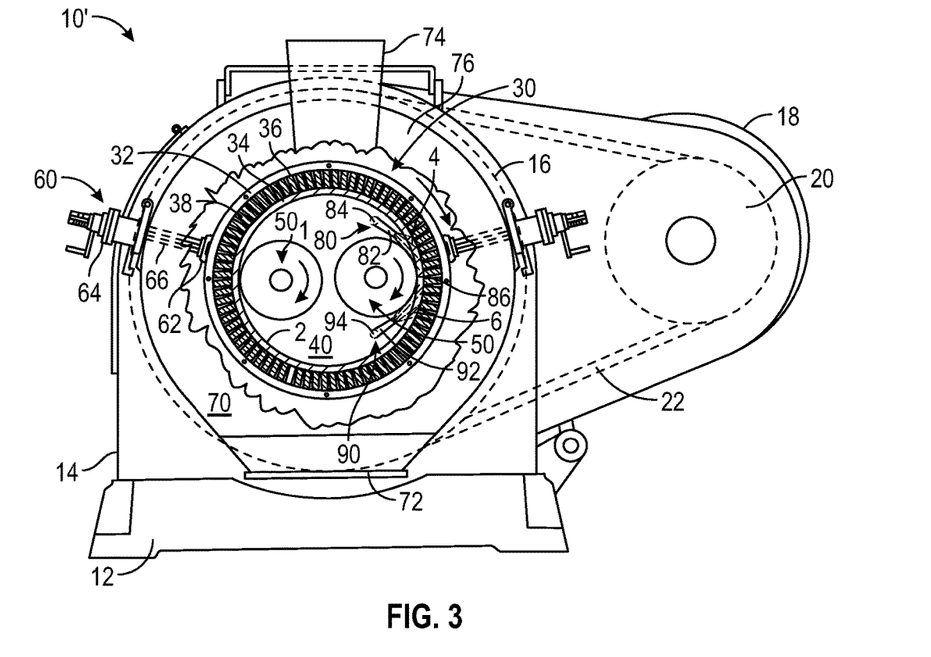
FIG. 3 is a front partial cutaway view of a second embodiment of a pellet mill according to the first aspect of the present invention.

FIG. 3 shows a second embodiment of a pellet mill 10' according to the first aspect of the present invention. The pellet mill 10' corresponds to the pellet mill 10 shown in FIGS. 1 and 2 except that it is only the roller 50 which has a nozzle arrangement 80, and in that a further nozzle arrangement 90 comprising a further nozzle 92 and a further pipe 94 is provided for spraying an additive fluid 6 onto the feed layer immediately after the feed layer has been formed or compressed by the roller 50. The nozzle arrangement 90 may be arranged for spraying the additive fluid 6 into an opening zone between the roller 50 and the inner surface 34 of the die 30. The additive fluid sprayed by the further nozzle arrangement may be water but it may also be other solutions.

Although FIG. 3 only shows one nozzle arrangement 80 and one further nozzle arrangement 90 for one of the rollers, each roller 50 and 50$_1$ may be provided with a nozzle arrangement and a further nozzle arrangement 80 and 90

Figure 4:
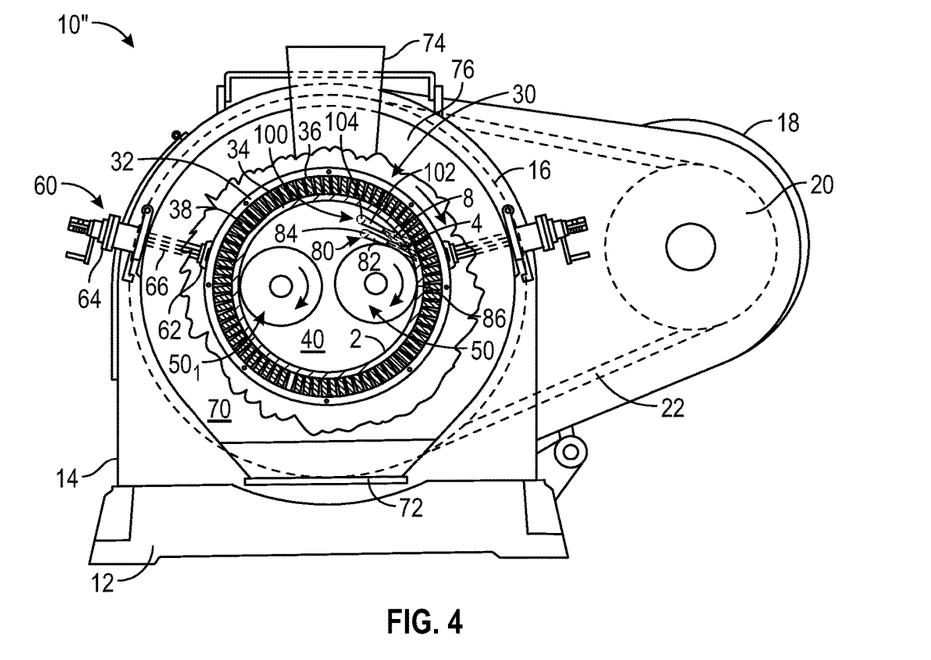
FIG. 4 is a front partial cutaway view of a third embodiment of a pellet mill according to the first aspect of the present invention.

FIG. 4 shows a third embodiment of a pellet mill 10" according to the first aspect of the present invention. The pellet mill 10" corresponds to the pellet mill 10 shown in FIGS. 1 and 2 except that the roller 50 is provided with a second nozzle arrangement 100, in addition to the (first) nozzle arrangement 80, comprising a nozzle 102 and a pipe 104. As in FIGS. 1 and 2 the first nozzle arrangement 80 is arranged for injecting a (first) additive fluid, typically water, into the nip between the roller 50 and the inner surface 34 of the die 30. The second nozzle arrangement 100 may be arranged for injecting a second additive fluid 8 into the nip, or the second additive fluid may be injected, i.e. sprayed onto, the feed layer 2 at a position upstream of the nip 86.

The first and second additive fluid may for example be the components of a two-component binding compound or adhesive.

The pellet mill 10" may be provided with a further nozzle arrangement 90 as in the pellet mill 10' of FIG. 3.

Although not shown in the figures the amount of water that is sprayed by the nozzle arrangement may be controlled based on the determining of a property of the pellets produced. The pipe 84 may for example be connected to a source of water (not shown) such as tap water, via a controllable valve (not shown). A sampling device (not shown) may comprise scales (not shown) for periodically weighing pellets produced by the pellet mill 10 or in real time measurements (e.g. motor current, spectroscopic sensors based on electromagnetic energy, etc.). A heater (not shown) may heat the pellets on the scales for a specified time whereby the weight loss of the pellet may indicate the water content of the pellets. The water content may be used in a look up table to determine how much the controllable valve should be opened to provide a desired moisture content in the pellets. The look up table may be loaded into the memory of a computer (not shown) connected to the scales and the controllable valve.

Alternatively the pellet mill 10 may comprise a rotational sensor (not shown) configured to determine the rotational position and/or rotational speed of the die 30. The computer may be connected to the rotational sensor and to the controllable valve and be configured to open the controllable valve more and more as the rotational speed of the die 30 increases.

Figure 5:
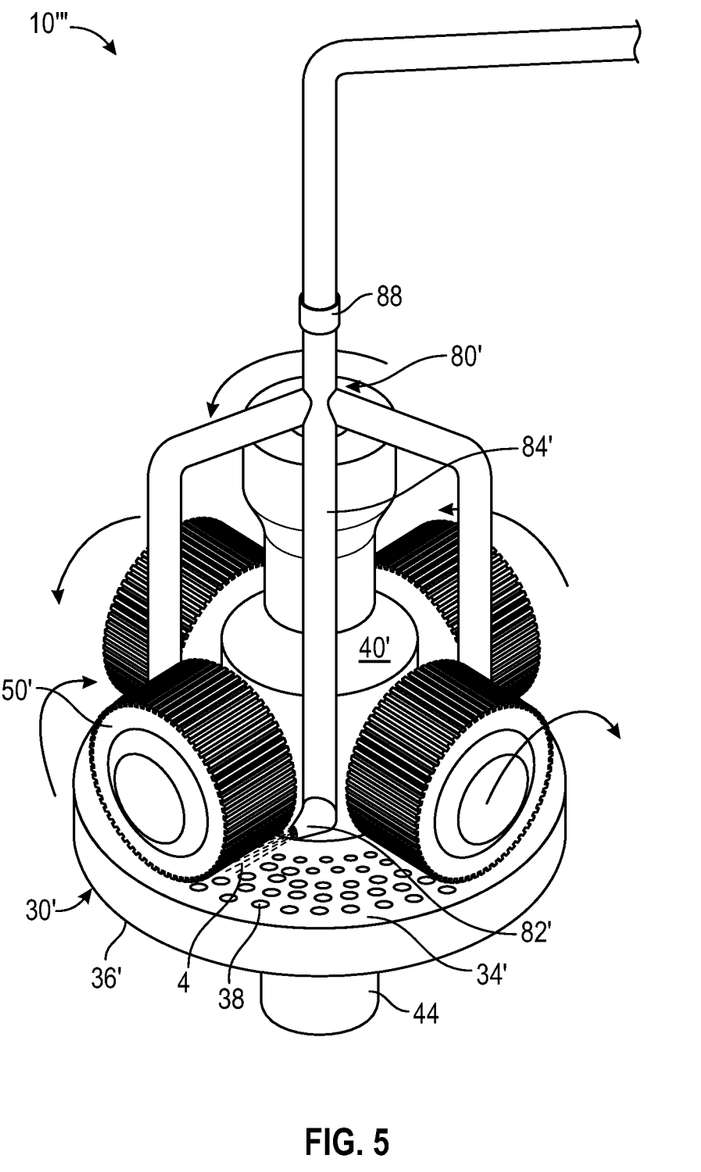
FIG. 5 is a schematic perspective view of a fourth embodiment of a pellet mill according to the first aspect of the present invention.

FIG. 5 is a schematic perspective view of a fourth embodiment of a pellet mill 10''' according to the first aspect of the present invention. The pellet mill 10''' is a flat die type pellet mill having a flat die 30' with an upper side 34' and a lower side 36'. The flat die 30' is held stationary while a roller holder 40' carries the rollers, one of which is designated the reference number 50'. The roller holder 40' is caused to rotate via shaft 44 so as to cause the rollers 50' to roll over the upper side 34'. To realize the injection of the additive fluid 4 a modified nozzle arrangement 80' is used comprising a nozzle 82 and a pipe 84' for roller 50. The pipes 84' join at a swivel joint or coupling 88 allowing the nozzle arrangement 80' to rotate with the roller holder 40'. As with the pellet mills shown in FIGS. 2-4 the pellet mill 10''' may be provided with further nozzle arrangement for providing further additive fluids.

EXAMPLE

Pelletizing with Pilot Scale Rotating Die

Materials and Methods

Willow was pretreated by being chipped and dried in a flatbed dryer at around 40° C. to moisture contents around 4-8% at the Biofuel Technology Centre, Swedish University of Agricultural Sciences (SLU), Umeå, Sweden. The dried and chipped willow was then torrefied by in a second generation pilot scale plant (200 kg h−1) in a continuous process in which the material to be torrefied was preheated in a rotary drum (220° C.) before being treated in a heated auger screw where torrefaction takes place at a temperature of 308° C. and a residence time of 9 minutes in an inert atmosphere obtained by N2 as a purge gas. The resulting mass yield was 83%.

The torrefied willow was then hammer milled with a screen size of 6 mm (Vertica Hammer Mill DFZK-1, Bühler AG, Uzwil, Switzerland). Moisture content was adjusted to about 9% w.b. in a blender by adding water during mixing. Prepared materials were left in silos for 16 hours to reach equilibrium before pelletizing.

The torrefied and milled willow was then pelletized with a Bühler DPCB pelletizer (Bühler AG, Uzwil, Switzerland) having a set of fixed but free rolling rollers and rotating die. The die had no temperature control system. A hose with a nozzle was installed so the water was injected right in to the space inside the die where the actual feed layer formation takes place, i.e. into the nip between the roller and the inner surface of the die. The water flow was monitored and measured via the pellet mill control unit. The die had press channels with 50 mm press channel length and 8 mm diameter, (press channel ratio of 6.25:1).

Pelletizing was performed in two different manners:
a) with an initially cold die without water injection, and
b) with an initially cold die with stepwise increased water injection.

Sampling

Triplicate samples of milled and moisture adjusted materials were taken from the falling stream prior to the pelletizing setup for analyses of moisture content, equilibrium moisture content, and drying rate.

Figure 6:
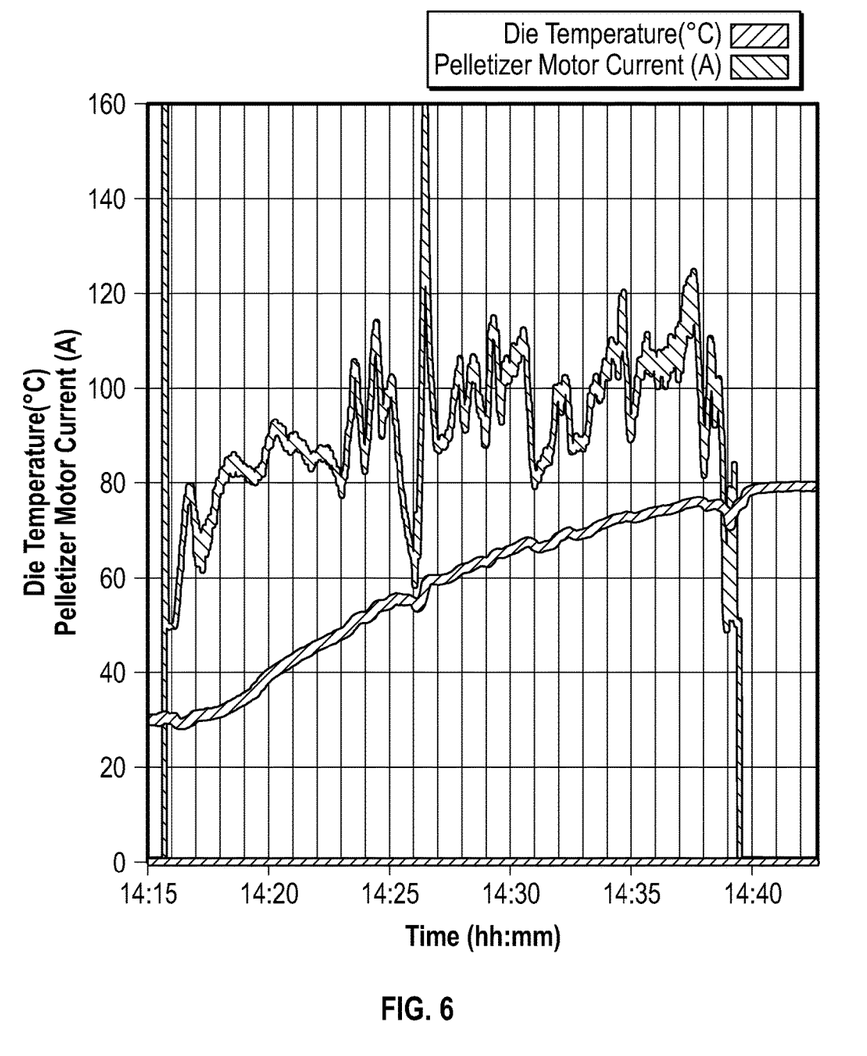
FIG. 6 is a diagram showing the die temperature and motor current as a function of time when operating a pelleting mill without water injection.

Pellet samples and process data from pelletizing of torrefied willow with a rotating die pelletizer was gathered at sampling periods 30 C1-C4, as shown in FIG. 6. C1-C4 represents a range of increasing die temperatures and cooling media rates. Each sampling period was 2 minutes long. Pellet samples were stored in open containers for 24 hours to cool and equilibrate. After cooling, samples were divided for analyses of bulk density, durability, fines, and moisture content. Production rate was calculated by measuring total sample weight during the sampling time. Pellet quality and moisture content analyses were performed according to CEN standards. Moisture content of raw material and pellets were determined by oven drying at 105° C. (EN 14774-2: 2009). The amount of fines in the produced pellets were stated by sieving the collected sample over a 3.15 mm sieve, weighing the fines, and calculating the share of fines as a percentage of the original sample. Pellet bulk density was determined according to standard (EN 15103:2009) by using a 5.2 liter (L) bucket and mechanical durability was determined by using a Q-tester (Simon Heesen B.V., Netherlands) according to standard procedure (EN 15210-1:2010).

Results

Pelletizing of torrefied willow in a ring die pelletizer without die cooling (FIG. 6) (a) gave rise to discontinuous process behavior where the temperature of the ring increases until the formed pellets almost smoldered. As the temperature reached about 78° C. the production of the pellets ceased spontaneously as the feed layer on the inner surface of the die broke loose from the die.

Figure 7:
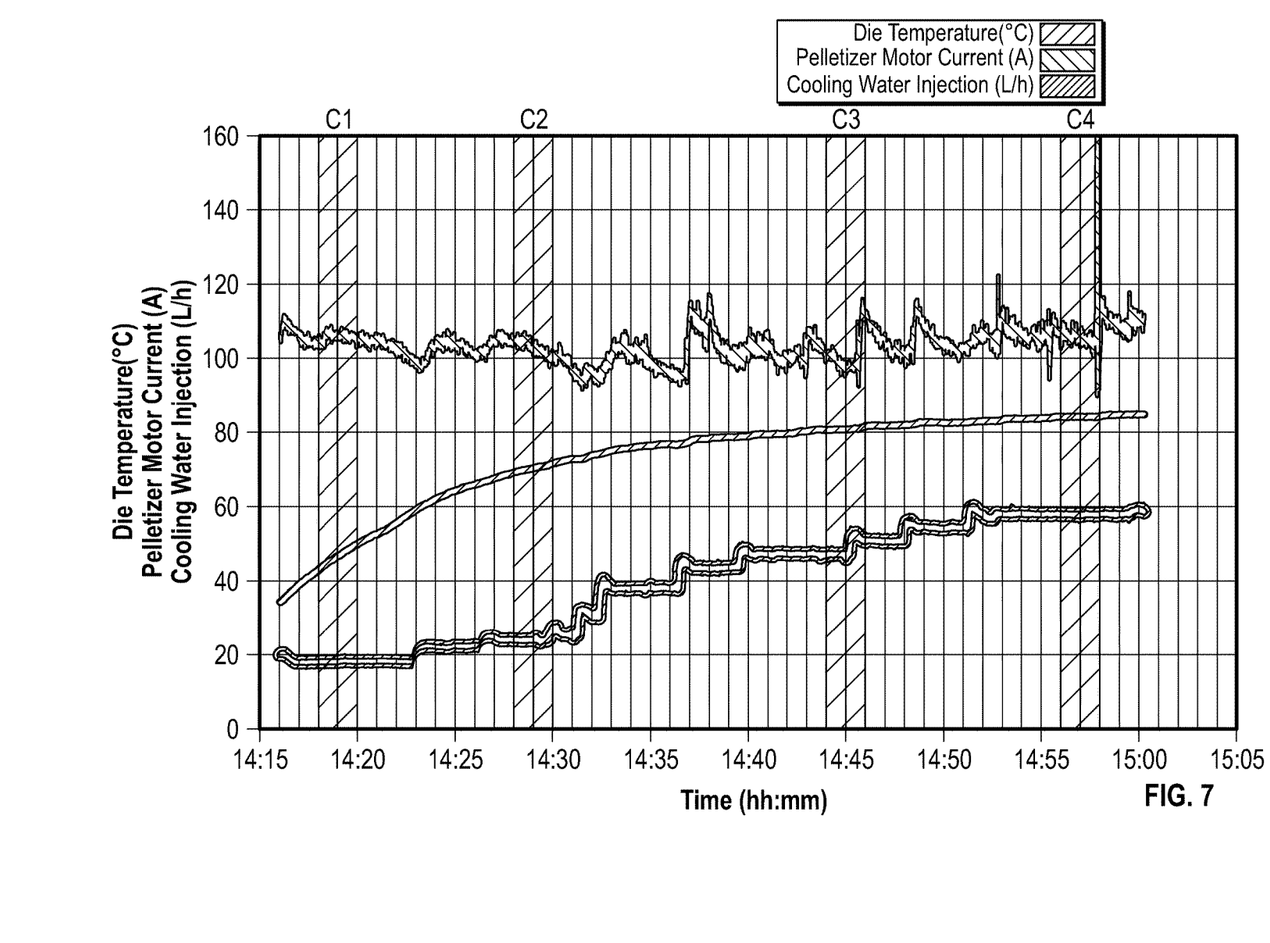
FIG. 7 is a diagram showing the die temperature, motor current and cooling water as a function of time when operating the pellet mill with water injection.
Figure 8A:
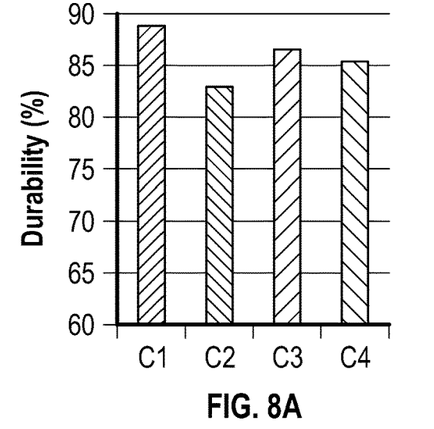
FIG. 8 shows durability, bulk density and fines of pellets sampled at different times C1-C4 during the operation of the pellet mill with water injection.
Figure 8B:
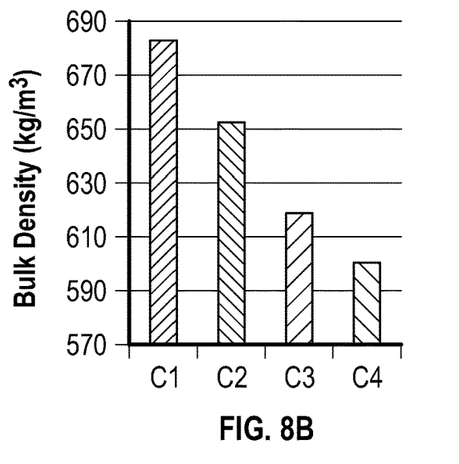
Figure 8C:
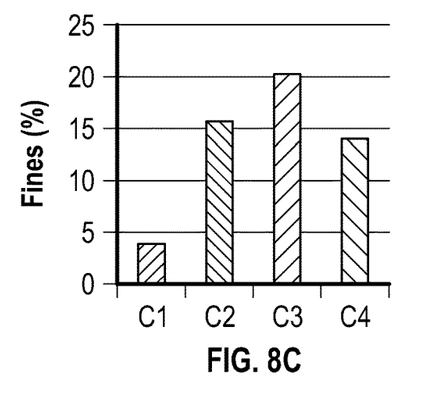

When the pelletizing was run with water injection into the nip, i.e. onto the feed layer, the pelletizer motor current was kept continuous (FIG. 7). Stable production conditions were maintained, also at die temperatures well above 80° C., by adapting the water injection rate to the die temperature. Pellets sampled throughout water injection (C1-C4) all had durability values above 83%, se FIG. 8A, but bulk density decreased from 683 to 601 kg m−3 as water injection rate was increased from 18 to 58 L h$^{-1}$, see FIG. 8B. Injection equalled 3-11 weight-% of the average pellet production rate; 550 kg h$^{-1}$. Still, moisture contents of pellets (after equilibrium in ambient air at room temperature for 24 h) were: C1: 6.5%; C2: 8 7.2%; C3: 8.5%; C4: 9.1%. The amount of fines initially increased (C1 to C3) and then decreased (C4), see FIG. 8C.

Discussion

In this example torrefied biomass has been pelletized. It is generally accepted that biomass torrefaction, requires a densifying step, i.e. pelletizing, to reach the desired energy density for a commercial product. However, contrary to what was expected, pelletizing of torrefied biomass is far from similar to making pellets from non-treated biomass. In particular one of the challenge concerns the feed layer loss, discontinuous pellet production, and the final cease of production that are shown in FIG. 5. This phenomenon is a result of raised die temperature that dries the material in the feed layer to a level when its adhesive forces (particle-to-particle as well as particle-to-die wall) do not withstand the force of the rollers friction. At this stage, the feed layer slips away from the nip between the die and the press rollers.

This effect may be accentuated if the material has low bulk density, low inner friction (particle-to-particle friction), and/or less sites for hydrogen bonding between compressed layers of particles. These are all typical properties for particulates of torrefied materials as they at the same particle size distribution have lower bulk density than untreated materials, same or improved flowability (lower internal friction), less sites of —OH and —COOH groups that bonds water molecules, lower equilibrium moisture contents (EMC), and dries faster than untreated materials.

The present example shows that cooling and moisturizing by water injection directly onto the feed layer prevented feed layer break-down at high die temperatures (well above 80° C.), When no water was injected the temperature increased steadily for 20 minutes from 38° C. to 78° C. when production ceased. Thus, by injecting water at die temperatures above those when production normally ended, it was possible to retain the feed layer and continue production.

Further the nozzle injection of water onto the feed layer into the nip between the roller and the die makes it possible to improve control of sub-process interactions when pelletizing materials such as for example torrefied biomass.

Without wishing to be bound by theory the present inventors believe that the especially advantageous results seen in this example are due to injecting the water directly into the nip between the roller and the die, i.e. by injecting the water directly where, and when, a new layer of material to be pelletized is added to the already formed feed layer.

Results also show that, when using low initial moisture contents, no feeding problems occur as the ones reported in the case of non-cooled pelletizing of torrefied materials (Larsson et al. DOI: 10.1016/j.apenergy.2012.08.046). The use of nozzle injection into the nip thus offers possibilities to better optimize moisture contents for the two sub-processes: feeding material to the press die and feed layer formation. The functionality of simultaneously cooling and controlling of the feed layers' moisture content by direct nozzle injection of water into the press nips is hereby proven.

Feasible Modifications of the Invention

The invention is not limited only to the embodiments described above and shown in the drawings, which primarily have an illustrative and exemplifying purpose. This patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

It shall also be pointed out that all information about/ concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A pellet mill, comprising:
    a die having a first surface and a second surface, the die further comprising press holes extending from the first surface to the second surface;
    at least one roller configured to roll over the first surface for forcing a pelletizable material, forming a feed layer on the first surface, through the press holes to the second surface; and
    a nozzle configured to provide an additive fluid directly into a nip defined between the at least one roller and the first surface.

2. The pellet mill according to claim 1, wherein the pellet mill comprises at least two rollers configured to roll over the first surface for forcing the pelletizable material, forming the feed layer on the first surface, through the press holes to the second surface, and wherein the nozzle is configured to provide at least one additive fluid directly into a nip defined between at least one of the at least two rollers and the first surface of the die.

3. The pellet mill according to claim 2, wherein the pellet mill comprises at least two nozzles, each of the at least two nozzles being configured to provide an additive fluid directly into a nip defined between a corresponding one of the at least two rollers and the first surface of the die.

4. The pellet mill according to claim 1, further comprising a further nozzle configured to provide a further additive fluid onto the first surface of the die at a position downstream of the at least one roller.

5. The pellet mill according to claim 4, wherein the further nozzle is configured to provide the further additive fluid directly into an opening zone formed between the at least one roller and the first surface.

6. The pellet mill according to claim 1, wherein the die is annular, whereby the first surface is an inner surface and the second surface is an outer surface.

7. The pellet mill according to claim 1, wherein the die is a flat die, whereby the first surface is an upper surface, and the second surface is a lower surface.

8. A method of producing pellets using a pellet mill that comprises a die having a first surface and a second surface, press holes extending from the first surface to the second surface, and at least one roller configured to roll over the first surface; for forcing a pelletizable material, forming a feed layer on the first surface, through the press holes to the second surface, the method comprising the steps of:
    (a) feeding a pelletizable material into the die and onto at least part of the first surface to form a feed layer on the first surface;
    (b) causing the roller to roll over the first surface to force the pelletizable material through the press holes to the second surface, while providing an additive fluid directly into a nip defined between the at least one roller and the first surface; and (c) cutting the pelletizable material emerging from the second surface into pellets.

9. The method according to claim 8, further comprising the steps of:

(d) determining an operational property of the pellet mill; and (e) controlling the amount of the additive fluid provided into the nip based on the property.

10. The method according to claim 8, further comprising the steps of:

(d) determining a property of the produced pellets; and (e) controlling the amount of the additive fluid provided into the nip based on the property.

11. The method according to claim 8, wherein the additive fluid comprises water.

12. A method of retrofitting a pellet mill that comprises a die having a first surface and a second surface, press holes extending from the first surface to the second surface, and at least one roller configured to roll over the first surface for forcing a pelletizable material, forming a feed layer on the first surface, through the press holes to the second surface, the method comprising the step of:

installing a nozzle in the pellet mill, the nozzle being configured to provide an additive fluid directly into a nip defined between the at least one roller and the first surface.

\* \* \* \* \*